UNITED STATES PATENT OFFICE.

JOHANN CARL WILHELM FERDINAND TIEMANN, OF BERLIN, ASSIGNOR TO HAARMANN & REIMER, OF HOLZMINDEN, GERMANY.

PROCESS OF CONVERTING COMPOUNDS OF THE CITRAL SERIES INTO ISOMERS.

SPECIFICATION forming part of Letters Patent No. 556,944, dated March 24, 1896.

Application filed October 16, 1893. Serial No. 488,322. (No specimens.) Patented in Germany September 8, 1893, No. 75,062; in Belgium September 23, 1893, No. 106,521; in England October 11, 1893, No. 19,144, and in France November 11, 1893, No 234,010.

*To all whom it may concern:*

Be it known that I, JOHANN CARL WILHELM FERDINAND TIEMANN, (coproprietor of the firm of Haarmann & Reimer, of Holzminden,) a subject of the King of Prussia, German Emperor, residing at Berlin, in the Kingdom of Prussia and German Empire, have invented new and useful Improvements in Processes of Converting Compounds of the Citral Series into Isomers, (for which I have obtained Letters Patent in Germany, No. 75,062, dated September 8, 1893; in Belgium, No. 106,521, dated September 23, 1893; in England, No. 19,144, dated October 11, 1893, and in France, No. 234,010, dated November 11, 1893,) of which the following is a specification.

I have found that the compounds of the citral series (geranium series) are converted by the action of dilute sulfuric acid into isomers having a higher specific gravity and a lower boiling-point than the original bodies.

*Example I.*—If, with shaking, oily geranium acid ($C_{10}H_{16}O_2$) is added to seventy per cent. sulfuric acid cooled to a temperature below zero, it is transformed into a solid isomeric acid, which, by pouring the mixture into water, extracting the dilute solution with ether and crystallizing from water or ligroine, is obtained in pure crystals. The geranium acid is liquid. The crystallized isogeranium acid melts at 103.5°. The geranium acid boils under a pressure of thirteen millimeters at a temperature of 153°. The isogeranium acid distills over under a pressure of eleven millimeters at a temperature of 138°.

*Example II.*—By exactly the same treatment the nitril of geranium acid ($C_{10}H_{15}N$) is transformed into the nitril of isogeranium acid.

Properties of the original body and of the product of conversion:

|  | Boiling-point. | Specific gravity. |
|---|---|---|
| Nitril of the geranium acid | 110° under a pressure of 10 millimeters. | 0.8709 |
| Nitril of the isogeranium acid | 87°–88° under a pressure of 11 millimeters. | 0.9208 |

*Example III.*—By heating in the water-bath the hydrocarbon obtained by separating carbonic acid from geranium acid (geranidene $C_9H_{16}$) with sixty per cent. sulfuric acid during three or four hours, it is converted in an analogous manner into an isomeric hydrocarbon, the isogeranidene, which by extracting with ether is separated and purified by rectifying by means of sodium.

Properties of the original body and of the product of conversion:

|  | Boiling-point at atmospheric pressure. | Specific gravity. |
|---|---|---|
| Geranidene | 142°–143° | 1.4368 |
| Isogeranidene | 138°–140° | 1.4434 |

The sulfuric acid may be replaced in the above-described conversions by other weak condensing agents, such as phosphoric acid, metaphosphoric acid, &c., which, as is commonly known, act in this respect in the same manner. However, by employing sulfuric acid I have obtained the best results.

The iso-compounds of the citral series (geranium series) are intended to be used for perfumery purposes.

What I claim as new is—

A process for converting compounds of the citral series (geranium series) into isomers having a lower boiling-point and a higher specific gravity than the original bodies, which process consists in subjecting the said compounds for some time to the action of dilute sulfuric acid, substantially as described.

In testimony whereof I have signed my name to this specification in the presence of two subscribing witnesses.

JOHANN CARL WILHELM FERDINAND TIEMANN.

Witnesses:
 GUSTAV HÜLSMANN,
 CARL MÜLLER.